United States Patent Office 3,226,262
Patented Dec. 28, 1965

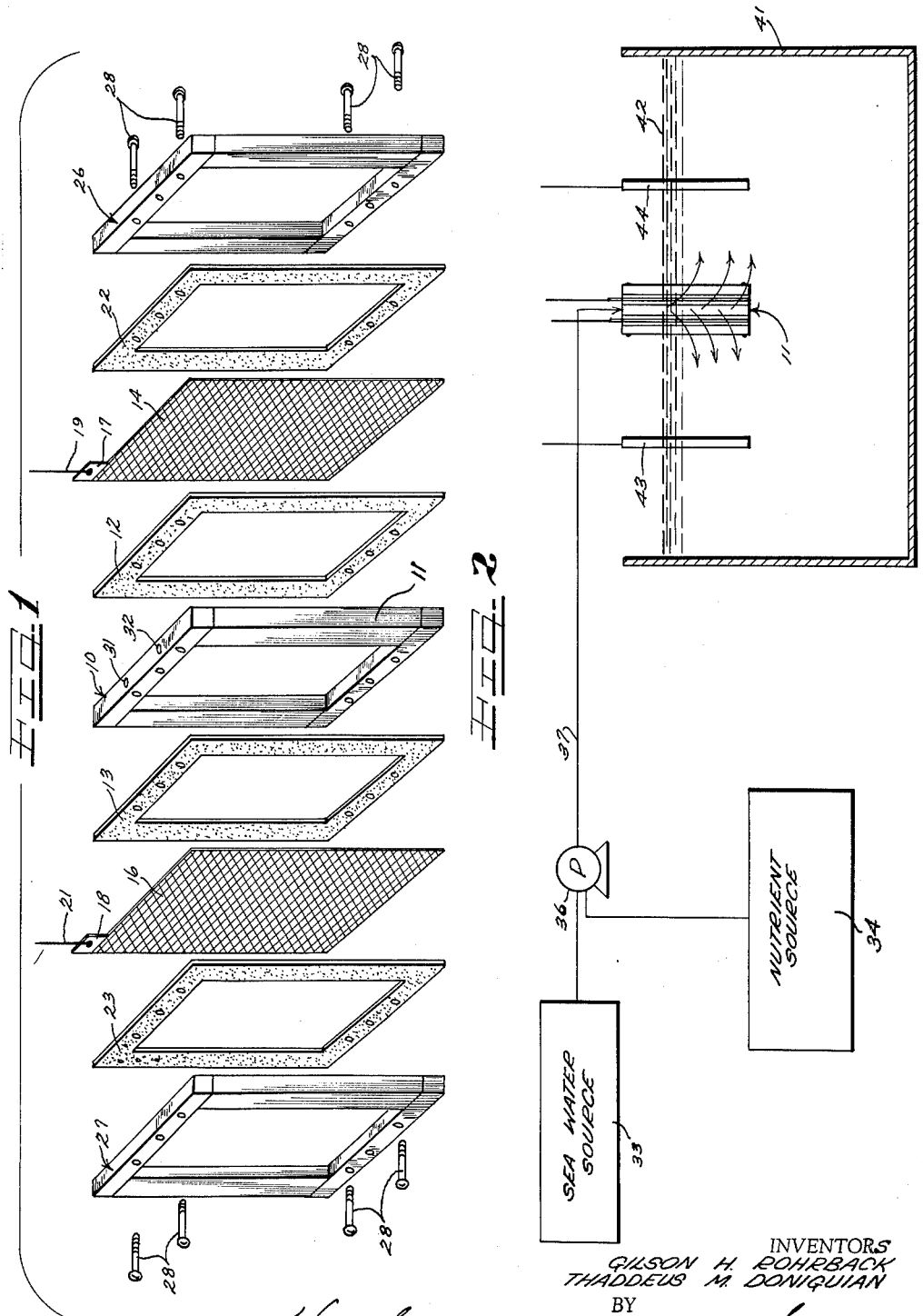

3,226,262
BIO-ELECTRODE ASSEMBLY FOR GENERATING ELECTRICITY
Gilson H. Rohrback, Whittier, and Thaddeus M. Doniguian, Anaheim, Calif., assignors, by mesne assignments, to TRW Inc., a corporation of Ohio
Filed Dec. 4, 1961, Ser. No. 157,610
5 Claims. (Cl. 136—86)

The present invention is directed to improvements in bio-electrode assembles used for the generation of electrical power.

Quite recently, there has been developed a bio-battery which makes possible the generation of electric power from water environments. These bio-batteries utilize biological materials such as micro-organisms, cell-free extracts of such micro-organisms, or enzymes whether recovered from the micro-organisms, or synthetically prepared. These materials, when placed in intimate contact with an electrode surface can be used to promote or make possible either anodic or cathodic reactions during generation of electric current. The mechanism by which these materials effectively promote half-cell reaction in their environment may be direct or indirect. For example, certain bacteria have the ability to participate directly in the electrochemical reactions occurring in the cell while others function to produce intermediate compounds which, in turn, participate in the electrochemical reaction.

Some of the materials function by carrying out oxidation-reduction reactions in their life processes which are exothermic. Others function by carrying out oxidation-reduction processes which require photo energy. These processes can be used to promote the cathode reaction in an electrochemical cell, to promote the anode reaction, or, by the selection of different species as the two electrodes, they can be used to promote both reactions simultaneously. In some instances, the use of these materials merely increases the efficiency of the electrochemical cell, and in others, it makes possible the generation of current which would not otherwise occur.

In all systems for the electrochemical generation of power, there are two distinct electrode processes occurring. The first is an anodic process in which a substance is being oxidized and thus gives up electrons to the electrode. The second is a cathodic process in which electrons are being consumed by a substance which is consequently reduced. The general equation representing both of these half-celled processes is given below:

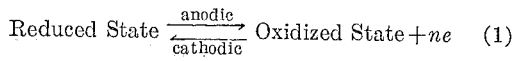

where "$ne$" represents a definite number of electrons given off or consumed for each distinct molecular species of the reduced or oxidized state.

The electrode potential for both the anodic and cathodic processes are given by the following equation:

$$E = E° + \frac{RT}{nF} \ln \frac{(\text{OXID})}{(\text{RED})} \qquad (2)$$

where $E°$ is the potential relative to the hydrogen electrode of the electrode reaction; R and F are constants; T is the absolute temperature; $n$ is the number of electrons involved; (OXID) is the product of the concentration of the oxidized substances; and (RED) is the product of the concentration of the reduced substances.

The above equation represents the potential of an electrode which is not supporting a flow of current. When this electrode is coupled to another electrode having a different potential and in the same electrolyte, the subsequent current flow causes the potential of both electrodes to change in a direction approaching each other. This change in electrode potential with current drain is caused primarily by the change in concentration of the reacting substances at the electrode surface. It can be seen from Equation 2 that the electrode functioning as an anode will be consuming the reduced substance so as to decrease the (RED) concentration and will be producing the oxidation substance so as to increase the (OXID) concentration. The opposite condition will exist at the electrode functioning as the cathode. Thus, the anodic electrode charges in a positive direction, or becomes more cathodic, and the cathodic electrode charges in the negative direction, or becomes anodic.

This phenomena of potential change with current drain caused by the depletion or build up of the reaction substances is called polarization. Any system which furnishes the reaction substance that is being consumed at the electrode, whether it is an oxidized or reduced species, or remove the substance which is being produced at that electrode, is called a "depolarizer."

Micro-organisms or enzymes function to influence the reactions occurring at the electrodes, and in some cases function as depolarizers. Some of these materials liberate or consume oxygen, sulfate, carbon dioxide, nitrogen compounds, or the like, and all these reactions involve oxidation-reduction systems. Accordingly, different couples of these electrode reactions can be promoted by the proper selection of micro-organisms or enzymes in the vicinity of one or both of the electrodes.

Heretofore, bio-electrode structures have been inoculated and sustained by agitating the electrode in an electrolyte containing nutrients for the growth and propagation of the organisms. With this type of system, it took a substantial period of time for the electrode to build up a thriving colony of the micro-organisms, with the result that the current density at the electrode did not build up to an acceptable value for extended periods of time. In addition, it frequently happened that the rate of liquid flow passed the electrode was so low that it was not effective for depolarization of the electrode and oxygen would damage the colony of organisms. Furthermore, bio-electrode structures of the past were not effective in isolating the organisms from their external environment with the result that contaminants were able to move in and damage the colony existing on the electrode surface.

One of the objects of the present invention is to provide an improved bio-electrode assembly in which conditions at the surface of the electrode are more conducive to rapid growth of the organisms thereon.

Still another object of the present invention is to provide a bio-electrode structure which effectively isolates the organisms appearing on the electrode from outside contaminants.

Still another object of the invention is to provide an improved bio-electrode structure which builds up a higher current capacity in a shorter period time than did previous bio-electrode structures.

Still another object of the present invention is to provide an improved method for carrying out an electrochemical reaction at a bio-electrode.

A further description of the present invention will be made in conjunction with the attached sheet of drawings which illustrate a preferred embodiment.

FIGURE 1 is an exploded view of the improved bio-electrode assembly; and

FIGURE 2 is a partly schematic view of the bio-electrode assembly incorporated into a cell for the generation of electrical power.

As shown on the drawings:

The particular electrode structure shown in FIGURES 1 and 2 makes use of two bio-electrodes, but it will be evident that any number of such electrodes can be combined in the same manner.

In the form of the invention shown in FIGURE 1, reference numeral 10 indicates a center support member consisting of a hollow rectangular frame 11 composed of a material inert to the electrolyte in which the assembly is to be disposed. Typically we may use synthetic resinous material such as acrylic polymers.

On opposite sides of the frame 11 there is disposed a pair of gasket sealing members 12 and 13 composed of a compressible material such as polyethylene foam.

The electrode structures themselves are porous to permit the passage of electrolyte and nutrient therethrough, and in the preferred form of the invention take the form of expanded metal grids 14 and 16 having tabs 17 and 18 to which conductors 19 and 21 may be attached. For purposes of illustration, we have found that a convenient size for the electrodes 14 and 16 provided by using an expanded metal grid having a long way dimension of $3/16''$ and a short way dimension of $1/16$ inch. The electrodes 14 and 16 may be composed of a material such as mild steel or other ferrous alloy which will support the growth of the organisms. Mild steel is particularly effective as a material for growing colonies of *Desulfovibrio desulfuricans*, a sulfate reducing bacteria which can be colonized on such an electrode to provide a cathode depolarizing action.

Outwardly from the two electrodes 14 and 16 are another pair of sealing gaskets 22 and 23. A pair of end closures 26 and 27, composed of acrylic resins or the like, are secured to the center frame 11 by means of self-tapping screws 28, the screws 28 extending through holes provided in the gaskets 12, 22, 13 and 23.

As shown in FIGURE 1, the center frame 11 is provided with a pair of ports 31 and 32 into which the electrolyte and nutrient can be introduced. In the case of sea water having a sufficient amount of nutrient to sustain the particular micro-organisms to be grown on the electrode structures, the sea water alone can be used.

As illustrated in FIGURE 2, the general case involves the use of a sea water source generally indicated at 33 and a nutrient source generally indicated at 34. Purely by way of example, a typical concentrated nutrient composition may have the following ingredients:

| | | |
|---|---|---|
| Ammonium chloride | g | 12 |
| Yeast extract | g | 30 |
| $K_2HPO_4$ | g | 6 |
| Sodium lactate, 60% | g | 120 |
| Ascorbic acid | g | 3 |
| Distilled water | ml | 1000 |

The sea water, generally at a pH of about 6.5 to 7.5 and the nutrient, also within the same pH range, is directed to a pump 36 having a discharge line 37 entering inlet ports 31 and 32 of the frame member 11. The pumping rate for the sea water is considerably higher than that of the nutrient, usually on the order of 10–30 to 1. The pump 36 provides the liquids under a slight positive pressure, sufficient to force them through the openings in the electrodes 14 and 16 without excessive turbulence. The positive pressure thus provided on the liquids is effective to keep out contaminants which would otherwise tend to interfere with the development of the bacteria at the surface at the electrodes.

In the form of the invention illustrated in FIGURE 2, the structure of FIGURE 1 is employed as a bio-cathode in a cell contained within a suitable housing 41. The level of the electrolyte in the cell is indicated at 42. It will be noted that in this environment, the bio-cathode is continuously exposed to oxygen which might damage the bacteria growing on the electrode surfaces were it not for the improved feeding means provided by the present invention.

A pair of anodes 43 and 44 complete the cell shown in FIGURE 2. These anodes have been shown separate from the bio-cathode for purposes of convenience, but it should be appreciated that the anodes can be attached to the support for the bio-cathode without interfering in any way with the operation of that assembly.

We have found that with the assembly of the present invention, we can get an increased current capacity with the same flow rate of electrolyte and nutrient heretofore employed with other bio-electrode assemblies. For example, we used an electrode of the type shown in FIGURE 1, initiating the inoculation for a few days without supplying any pressure from the pump. Then, as current started to flow, pumping was started at the rate of 2.75 cc. of sea water per minute. The sea water to nutrient ratio was about 11 to 1. The area of the electrodes was .337 square feet. The following currents were observed at the indicated time after pumping was started:

| Time, hrs. | Current, ma. |
|---|---|
| 3.5 | 3.5 |
| 21 | 15 |
| 24 | 20 |
| 49 | 42 |
| 73 | 54 |
| 93 | 65 |
| 117 | 85 |
| 141 | 200 |

From the foregoing, it will be understood that the bio-electrode assembly of the present invention provides a more efficient current generating apparatus than has heretofore been employed in bio-batteries. Along with the improved efficiency, the bio-electrode structure has the advantage of protecting the bio-electrode from contamination by outside influences.

It will be understood that various modifications can be made to the described embodiments without departing from the scope of the present invention.

We claim as our invention:

1. A bio-electrode assembly comprising a pair of spaced hollow frame members, one of said members having an inlet port extending therethrough for introducing liquid electrolyte and a nutrient into the hollow interior thereof, and a porous electrode confined between said pair of hollow frame members in sealed relation along its periphery, said electrode being composed of a metal receptive to micro-organism growth and having attached thereto a colony of micro-organisms thereon capable of promoting a half cell reaction at said electrode, whereby said electrolyte and nutrient flowing into said hollow interior of said one frame member are delivered through said porous electrode and out through the hollow interior of the other of said frame members.

2. The assembly of claim 1 in which said porous electrode includes an expanded metal grid.

3. The assembly of claim 1 in which said inlet port is positioned to direct said electrolyte and nutrient transversely of said frame, and said electrolyte and nutrient pass through said porous electrode at right angles to the direction of introduction of the liquid into said assembly.

4. A bio-electrode assembly comprising a central hollow frame member having an inlet port for introducing a liquid electrolyte and nutrient into the hollow interior thereof, a first electrode positioned on one side of said central frame member and a second electrode positioned on the other side of said central member, said electrodes being sealingly engaged at their peripheries against said central frame member, each of said electrodes consisting of a porous metal support being composed of a metal receptive to micro-organism growth and having a colony of micro-organisms thereon capable of promoting a half cell reaction thereon, and a pair of end hollow frame members disposed on opposite sides of said central frame member and secured thereto thus providing discharge ports for liquid electrolyte introduced through said central frame member and passing transversely through said electrodes in opposite directions.

5. The assembly of claim 1 in which said porous electrode is composed of a ferrous metal.

References Cited by the Examiner

UNITED STATES PATENTS

| | | | |
|---|---|---|---|
| 2,925,454 | 2/1960 | Justi et al. | 136—86 |
| 3,012,086 | 12/1961 | Vahldieck | 136—86 |
| 3,062,909 | 11/1962 | Reutschi | 136—86 |
| 3,088,990 | 5/1963 | Rightmire et al. | 136—86 |
| 3,134,697 | 5/1964 | Niedrach | 136—86 |
| 3,149,921 | 9/1964 | Warner | 136—86 X |

OTHER REFERENCES

De Zubay, E. A. et al.: Fuel Cells, Industrial Research, pages 23 and 24, October 1961.

Journal of Bacteriology, vol. 21, January–June 1931, pages 18–19.

Proc. Royal Soc., London (Series B) (Biological Papers), vol. 84, March 1912, pages 260–276.

Science and Mechanics, August 1961, pages 116–117.

ALLEN B. CURTIS, *Primary Examiner.*

JOHN R. SPECK, WINSTON A. DOUGLAS, *Examiners.*